April 1, 1952  F. W. CALDWELL  2,590,932
AIRCRAFT TURBINE-PROPELLER CONTROL SYSTEM
Filed June 22, 1948  2 SHEETS—SHEET 1
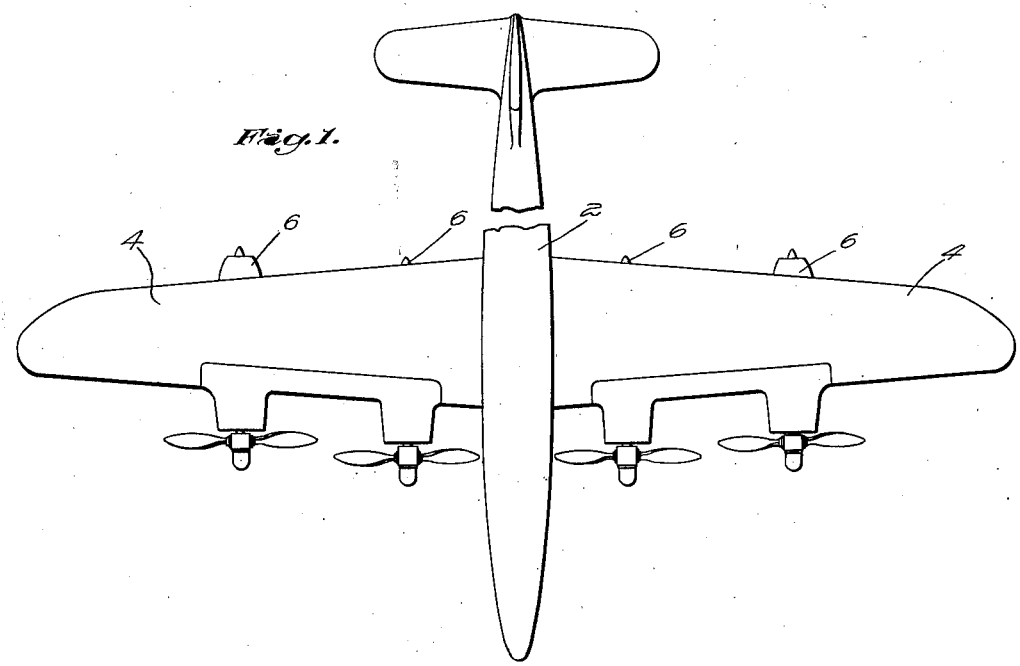
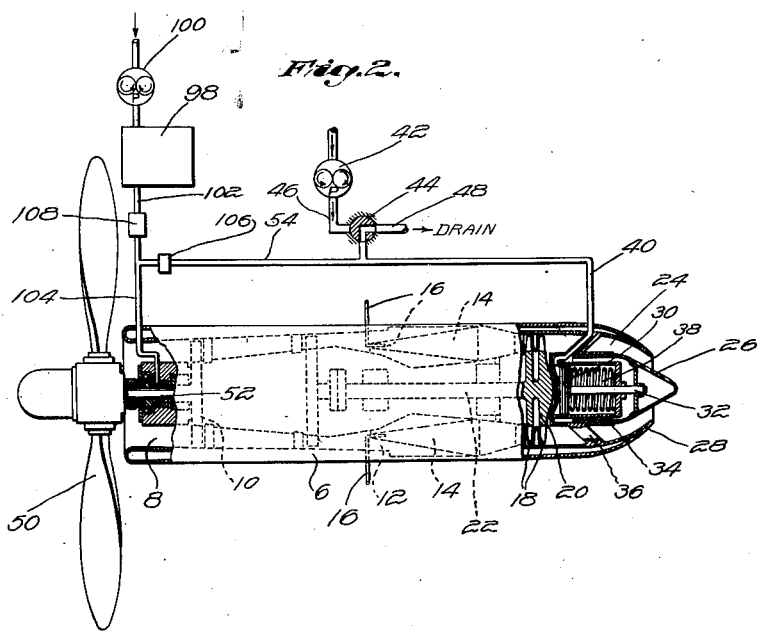
Inventor
Frank W. Caldwell
by Charles A. Warren
Attorney April 1, 1952  F. W. CALDWELL  2,590,932
AIRCRAFT TURBINE-PROPELLER CONTROL SYSTEM
Filed June 22, 1948  2 SHEETS—SHEET 2
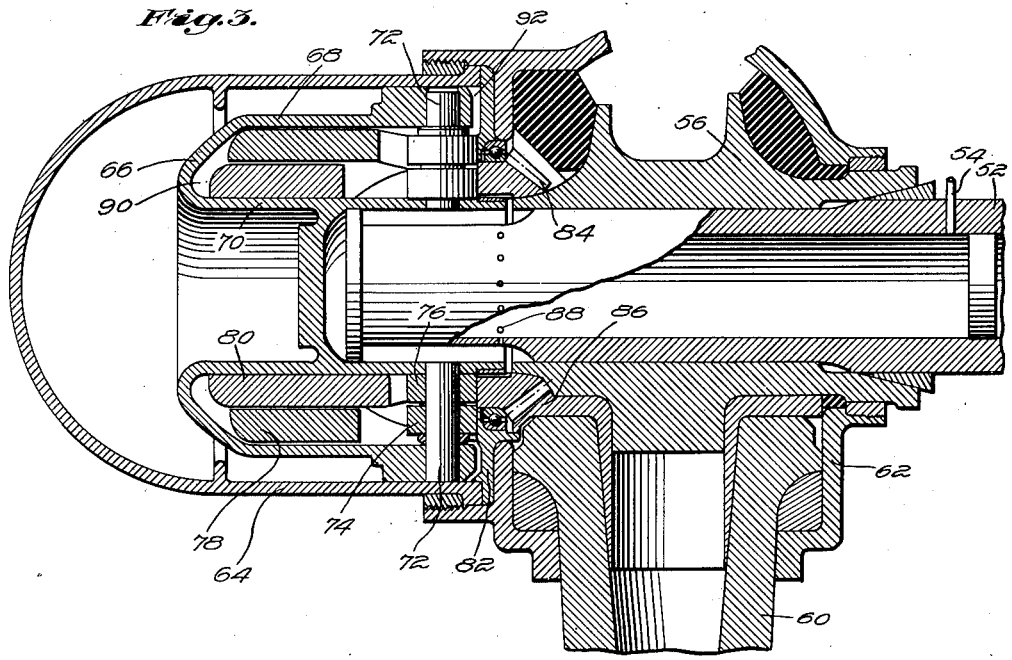
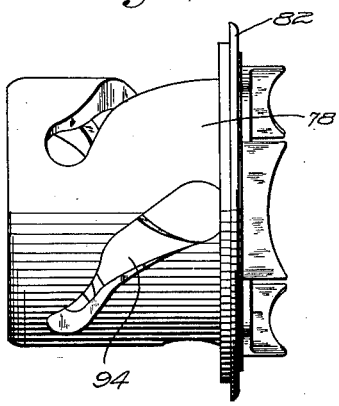
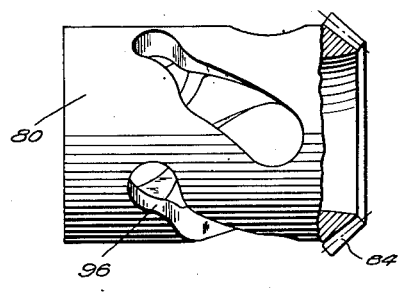
Inventor
Frank W. Caldwell
By Charles A. Warren
Attorney Patented Apr. 1, 1952

2,590,932

UNITED STATES PATENT OFFICE 2,590,932

AIRCRAFT TURBINE-PROPELLER CONTROL SYSTEM

Frank W. Caldwell, West Hartford, Conn., assignor to United Aircraft Corporation, East Hartford, Conn., a corporation of Delaware Application June 22, 1948, Serial No. 34,439

10 Claims. (Cl. 170—135.71)

This invention relates to gas turbine power plants for aircraft.

Propjet and turbojet aircraft engines require the compression and subsequent heating and expansion of large quantities of air and thus require a large air inlet normally directed forward of the aircraft to take advantage of the ram effects. If the power plant is shut down in flight for any reason, air will continue to flow through the power plant without producing any propulsive thrust, and, in fact, seriously increasing the drag on the aircraft. A feature of the invention is an arrangement for stopping the flow of air through the power plant in the event of the shut down of the power plant.

Continued flow of air through the power plant when it has been shut down may cause continued turning of the rotor of the power plant and possibly cause damage to the rotor or to the parts adjacent thereto. A feature of the invention is an arrangement to prevent such continued turning of the rotor or rotors of the power plant by preventing the flow of air through the power plant. This feature is particularly advantageous in propjets where the shut down is caused by propeller damage since the unbalance of the propeller, if it continued to turn would cause extensive detrimental vibrations. In propjet power plants, shut down of the power plant normally permits the propeller to windmill, thereby continuing the spinning of the rotor of the power plant. This may be overcome by feathering the propeller system. A feature of the invention is an arrangement for closing the air path through the power plant when the propeller is feathered. By this arrangement the drag of the power plant is reduced to a minimum and continued spinning of the rotor is prevented.

Other objects and advantages will be apparent from the specification and claims, and from the accompanying drawings which illustrate an embodiment of the invention.

Fig. 1 is a plan view showing a multi-engined aircraft with propjets to which the invention is applied.

Fig. 2 is a side elevation of the power plant with parts broken away to show the invention more clearly.

Fig. 3 is a sectional view of a propeller system adapted for being feathered.

Fig. 4 is a side elevation of one of the actuating cams of Fig. 3.

Fig. 5 is a side elevation of the other of the actuating cams of Fig. 3.

Referring first to Fig. 1, the invention is shown as applied to a four-engine aircraft 2, having wings 4 in which the power plants 6 are mounted. If any one of the power plants is shut down, it becomes advantageous to stop the flow of air through the power plant thereby minimizing the drag of the power plant. At the same time the stopping of the flow through the power plant will also prevent any further spinning of the rotor which might otherwise result from the flow of air over the compressor or turbine plants. It is believed that because of the large air inlet area to this type of power plant, the drag resulting from the stopping of one power plant will seriously affect the operation of the aircraft.

Referring now to Fig. 2, each power plant 6 may be a conventional turbojet or turboprop unit having an air inlet 8 through which air enters the compressor 10, shown in this case as a multistage, axial flow compressor. At the discharge end of the compressor, the air enters the combustion chamber duct 12 within which may be located a combustion chamber 14 into which fuel is injected as by a series of nozzles 16. The fuel is burned in the combustion chamber and is delivered from the combustion chamber against the blades 18 on the turbine rotor 20 which is connected as by a shaft 22 to the compressor. Gas leaving the turbine is discharged through an annular thrust nozzle 24, the discharge area of which may be controlled by a centrally located axially slidable cone 26.

For the purpose of cutting off the flow of air through the power plant as the latter is shut down, the cone 26 is moved axially into engagement with the trailing edge of the ring 28 which forms the outer wall of the annular path for the nozzle. To accomplish this, the cone 26 carries a piston 30 connected thereto as by a piston rod 32. The piston is slidable in a fixed cylinder 34 supported as by radially extending legs 36. The piston 30 is moved in a direction for opening the thrust nozzle as by a spring 38 and is moved in the opposite direction by fluid under pressure entering the end of the cylinder 34 as through a duct 40. Fluid under pressure is supplied by a pump 42 through a valve 44, the latter being arranged to connect conduit 40 directly to the pump conduit 46 or to a drain conduit 48.

In addition to closing the thrust nozzle for stopping a flow of air through the unit, the propeller 50, which is driven from the turbine as by a shaft 52, may be moved into feathered position preferably simultaneously with the closing of the thrust nozzle and by fluid under pressure controlled by the same valve 44. As shown, as conduit 54 extends from the conduit 40 to the propeller system, the latter being arranged to be feathered by the application of fluid under pressure thereto. A propeller of this type is shown, for example, in the Caldwell et al. Patent No. 2,174,717, which, in addition to being a controllable pitch propeller, may be feathered by the application of fluid under high pressure to the system.

For the purpose of this invention, as shown in Figs. 3, 4, and 5, the propeller pitch changing and feathering mechanism may include the propeller shaft 52 on which is mounted a spider 56 carrying the blades 60 held in position by a hub barrel 62. The hub barrel carries at its forward end a housing 64 which encloses the pitch changing mechanism. The pitch changing mechanism includes a piston 66 formed of concentric sleeves 68 and 70 interconnected at their forward ends. This piston carries pins 72 on which are mounted bearing rings 74 and 76, coacting with a stationary cylindrical cam 78 and a movable cylindrical cam 80 surrounded by the cam 78. Cam 78 has a projecting flange 82 which may be engaged and clamped by the end of the housing 64 to prevent rotation of the cam. The cam paths 94 and 96 of the cams 78 and 80 slope in opposite directions, as best shown in Figs. 4 and 5, so that axial movement of the piston 66 will cause rotary movement of that piston and also rotary movement of the cam 80. Motion of the cam 80 is transmitted by means of the gear teeth 84 thereon to the gear segments 86 to which each of the propeller blades is connected.

Fluid under pressure enters the hollow shaft 52 through the duct 54 and is directed to the side of the piston 66 adjacent to the propeller blades for the purpose of increasing the pitch of the blades. From the hollow shaft 52, the fluid escapes through passages 88 in the shaft and around the pitch changing cams into the space 90 between the inner and outer sleeves of the piston and also into the space 92 at the end of the outer sleeve 68 of the piston. This fluid moves the piston 66 to the left, Fig. 3, to increase the pitch of the propeller blades. A decrease in the pressure of the fluid will permit a decrease in pitch to take place by the action of centrifugal force on the individual blades.

It will be noted that the slope of the cam paths 94 and 96 is materially changed between the ends. During normal operation of the propeller, the pressure of the fluid introduced into the pitch changing mechanism is limited to a pressure insufficient to force the bearing rings 74 and 76 beyond the steeper part of the cam paths. The normal pitch changes of the propeller may be controlled, for example, by a governor 98 which adjusts the pressure of the fluid from a pump 100 through a line 102 to the conduit 54, merging with the conduit 54 in a common conduit 104 to the propeller system. A check valve 106 may be provided in the conduit 54 to prevent the loss of fluid through conduit 54 into valve 44. When it becomes advantageous to increase the pitch of the blades farther for the purpose of feathering the propeller system, the oil pressure from pump 42, which is at a substantially higher pressure than that of the pump 100, is admitted through conduit 54. This higher pressure is sufficient to force the bearing rings 74 and 76 into the less steeply sloping parts of the cam paths and move the propeller blades into feathered position. It will be understood that a check valve 108 in the line 102 prevents the loss of pressure through the line 102 while the propeller is being feathered.

The mechanism for unfeathering the propeller is not a part of the invention but may be a mechanism of the type described in the above-mentioned Caldwell et al. Patent No. 2,174,717.

It is thus apparent that the invention resides in an arrangement for closing the air path through the compressor-turbine power plant when the latter is not operating as, for example, by moving the control cone for the thrust nozzle into such a position that no gas can pass therethrough. Simultaneously with the closing of the thrust nozzle, the propeller system may be adjusted so that the propeller blades are in feathered position to reduce as much as possible any resistance to forward motion of the airplane and also to avoid any tendency of the propeller blades to turn rotary parts of the power plant. Although the mechanisms shown for accomplishing these results are hydraulically actuated, it will be apparent that the invention is not limited, in its broader aspects, to hydraulic mechanisms since other mechanisms for accomplishing these purposes will be readily apparent.

It is to be understood that the invention is not limited to the specific embodiment herein illustrated and described, but may be used in other ways without departure from its spirit as defined by the following claims.

I claim:

1. In a gas turbine power plant, a compressor having an open inlet, a combustion chamber through which gas from the compressor passes and in which the gas is heated, a turbine through which gas from the combustion chamber flows for developing power to drive the compressor, and a propeller driven by the power plant, in combination with hydraulic means for feathering the propeller and other hydraulic means for closing the gas path through the power plant, and a single valve means for directing actuating fluid to both of said last means simultaneously.

2. In a power plant, a compressor, a turbine connected to and driving said compressor, a combustion chamber in which gas from the compressor is heated before it reaches the turbine, and a propeller driven by said power plant, in combination with means for closing the gas passage through the power plant and other means for feathering the propeller, said feathering and closing means being interconnected to operate in unison.

3. In a multiengined aircraft, a plurality of power plants some of which are gas turbine power plants, each gas turbine power plant including a turbine, a propeller driven by the turbine, and a compressor also driven by the turbine and supplying gas to the turbine, in combination with hydraulically actuated means for feathering the propeller, hydraulic means for closing the gas path through the compressor and turbine, a source of hydraulic power, power lines connecting said source to both hydraulic actuated means, and valve means in said lines for simultaneously admitting fluid to both of said hydraulically actuated means.

4. In a multiengined aircraft, a plurality of power plants some of which are gas turbine power plants, each gas turbine power plant including a turbine, a propeller driven by the turbine, and a compressor also driven by the turbine and supplying gas to the turbine, in combination with fluid actuated means for feathering the propeller on at least one of said gas turbine power plants, fluid actuated means for closing the gas path through said one gas turbine power plant, a source of fluid power, power lines connecting said source to both fluid actuated means, and valve means in said lines for admitting fluid simultaneously to both of said fluid actuated means.

5. In combination, a gas turbine power plant having a compressor having an open inlet, a combustion chamber to which gas from the compressor passes and by which the gas is heated and a turbine through which gas from the combustion chamber flows, a propeller driven by the power plant, means including a motor for feathering the propeller, means including a motor for closing the gas path through the power plant, a source of power, and a power control for simultaneously actuating said feathering means and said closing means by connecting said source of power to said motors.

6. In combination, a gas turbine power plant having a compressor having an open inlet, a combustion chamber through which gas from the compressor passes and in which the gas is heated and a turbine through which gas from the combustion chamber flows, a propeller driven by the power plant, means for feathering the propeller, means for closing the gas path through the power plant, a source of power, means operably connecting said source of power to said feathering means and said closing means including a single power line, and a power control in said single power line for simultaneously actuating said feathering means and said closing means by simultaneously connecting them to said source of power.

7. In combination, a gas turbine power plant having a compressor having an open inlet, a combustion chamber through which gas from the compressor passes and in which the gas is heated and a turbine through which gas from the combustion chamber flows, a propeller driven by the power plant, means including a motor for feathering the propeller, means including a motor for closing the gas path through the power plant, a source of power, means operably connecting said source of power to said feathering means and said closing means including a single power line, and a power control in said single power line for simultaneously actuating said feathering means and said closing means by simultaneously connecting said source of power to each of said motors.

8. In combination, a gas turbine power plant having a compressor having an open inlet, a combustion chamber through which gas from the compressor passes and in which the gas is heated and a turbine through which gas from the combustion chamber flows, a propeller driven by the power plant, hydraulic means including a motor for feathering the propeller, hydraulic means including a motor for closing the gas path through the power plant, a source of fluid power, means operably connecting said source of power to said feathering means and said closing means including a single fluid power line, and a valve in said single fluid power line for simultaneously actuating said feathering means and said closing means by simultaneously connecting said source of fluid power to each of said motors.

9. In combination, a gas turbine power plant having a compressor having an open inlet, a combustion chamber through which gas from the compressor passes and in which the gas is heated and a turbine through which gas from the combustion chamber flows, a propeller driven by the power plant, means including a motor for feathering the propeller, means including a motor for closing the gas path through the power plant, a source of power, means operably connecting said source of power to said feathering means and said closing means including power lines, and a power control for simultaneously actuating said feathering means and said closing means by simultaneously connecting said source of power to each of said motors through said power lines.

10. In combination, a gas turbine power plant having a compressor having an open inlet, a combustion chamber through which gas from the compressor passes and in which the gas is heated and a turbine through which gas from the combustion chamber flows, a propeller driven by the power plant, hydraulic means including a motor for feathering the propeller, hydraulic means including a motor for closing the gas path through the power plant, a source of fluid power, means operably connecting said source of power to said feathering means and said closing means including fluid power lines, and valve means for simultaneously actuating said feathering means and said closing means by simultaneously connecting said source of fluid power to each of said motors through said fluid power lines.

FRANK W. CALDWELL.

REFERENCES CITED

The following references are of record in the file of this patent:

UNITED STATES PATENTS

| Number | Name | Date |
|---|---|---|
| 853,124 | Schaun | May 7, 1907 |
| 2,280,835 | Lysholm | Apr. 28, 1942 |
| 2,423,183 | Forsyth | July 1, 1947 |
| 2,426,008 | Forsyth | Aug. 19, 1947 |
| 2,452,298 | Goode | Oct. 26, 1948 |
| 2,457,595 | Orr | Dec. 28, 1948 |
| 2,474,143 | Forsyth | June 21, 1949 |
| 2,510,506 | Lindhagen et al. | June 6, 1950 |

FOREIGN PATENTS

| Number | Country | Date |
|---|---|---|
| 409,498 | Great Britain | May 3, 1934 |
| 587,516 | Great Britain | Apr. 29, 1947 |
| 587,558 | Great Britain | May 7, 1947 |
| 542,528 | France | May 18, 1922 |